(12) United States Patent
Zhang et al.

(10) Patent No.: US 9,609,575 B2
(45) Date of Patent: Mar. 28, 2017

(54) INTELLIGENT ROUTING OF NETWORK PACKETS ON TELECOMMUNICATION DEVICES

(71) Applicant: T-Mobile USA, Inc., Bellevue, WA (US)

(72) Inventors: Hongliang Zhang, Samammish, WA (US); Pablo Tapia, Snoqualmie, WA (US); Mark McDiarmid, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 72 days.

(21) Appl. No.: 13/732,111

(22) Filed: Dec. 31, 2012

(65) Prior Publication Data

US 2014/0185519 A1   Jul. 3, 2014

(51) Int. Cl.
 *H04W 40/24* (2009.01)
 *H04W 48/18* (2009.01)
(52) U.S. Cl.
 CPC ......... *H04W 40/248* (2013.01); *H04W 48/18* (2013.01)
(58) Field of Classification Search
 CPC .................................................. H04W 40/248
 See application file for complete search history.

(56) References Cited

U.S. PATENT DOCUMENTS

| 7,792,516 B2* | 9/2010 | Soderstrom | G06Q 20/10 455/405 |
| 7,925,212 B2* | 4/2011 | Eisenbach | 455/41.2 |
| 2003/0043773 A1 | 3/2003 | Chang | |
| 2004/0092285 A1 | 5/2004 | Kodim | |
| 2004/0165597 A1 | 8/2004 | Bicknell et al. | |
| 2005/0070280 A1* | 3/2005 | Jung et al. | 455/434 |

(Continued)

FOREIGN PATENT DOCUMENTS

| WO | WO2007015962 | 2/2007 |
| WO | WO2007070782 | 6/2007 |
| WO | WO2008045797 | 4/2008 |

OTHER PUBLICATIONS

PCT Search Report and Written Opinion mailed Mar. 11, 2014 for PCT application No. PCT/US13/71657, 13 pages.

(Continued)

*Primary Examiner* — Jason Mattis
(74) *Attorney, Agent, or Firm* — Lee & Hayes, PLLC

(57) ABSTRACT

A telecommunication device configured to select one of a plurality of network connectivities of the telecommunication device to use for transmission of a network packet is described herein. The telecommunication device may select the network connectivity based on user routing criteria, connectivity metrics, or transmission times. The user routing criteria may be dynamically updated during a communication or connection, affecting selection of the network connectivity for further network packets. The network connectivities may be respectively associated with different network operators. Also, the telecommunication device may select a first network connectivity for transmitting a first network packet and a second network connectivity for transmitting a second network packet. Further, the telecommunication device may select a first network connectivity for uplink communications and a second network connectivity for downlink communications.

19 Claims, 7 Drawing Sheets

(56) References Cited

U.S. PATENT DOCUMENTS

| | | |
|---|---|---|
| 2005/0164650 A1* | 7/2005 | Johnson .......................... 455/95 |
| 2006/0268712 A1* | 11/2006 | Deen et al. .................... 370/235 |
| 2007/0019670 A1 | 1/2007 | Falardeau |
| 2007/0136473 A1* | 6/2007 | Birchler et al. ............. 709/226 |
| 2007/0286092 A1 | 12/2007 | Famolari et al. |
| 2008/0080411 A1* | 4/2008 | Cole ............................ 370/328 |
| 2008/0253304 A1 | 10/2008 | Torabi |
| 2009/0005048 A1 | 1/2009 | Bae et al. |
| 2009/0245496 A1 | 10/2009 | Maione et al. |
| 2009/0325581 A1* | 12/2009 | Lu et al. ....................... 455/436 |
| 2010/0095065 A1* | 4/2010 | Gray et al. ................... 711/122 |
| 2011/0131338 A1 | 6/2011 | Hu |
| 2011/0320588 A1* | 12/2011 | Raleigh ........................ 709/224 |
| 2012/0163180 A1 | 6/2012 | Goel |
| 2012/0166622 A1* | 6/2012 | Draznin et al. .............. 709/224 |
| 2012/0208496 A1 | 8/2012 | Raleigh |
| 2012/0224528 A1 | 9/2012 | Tapia et al. |
| 2012/0236739 A1 | 9/2012 | Wang |
| 2012/0238287 A1* | 9/2012 | Scherzer ..................... 455/456.1 |
| 2012/0270504 A1 | 10/2012 | Zhang et al. |
| 2012/0322505 A1 | 12/2012 | Lodeweyckx |
| 2013/0157711 A1* | 6/2013 | Lee et al. ..................... 455/525 |
| 2013/0324087 A1 | 12/2013 | Zhong |
| 2014/0172946 A1 | 6/2014 | Hershberg et al. |
| 2014/0187242 A1 | 7/2014 | Zhang |

OTHER PUBLICATIONS

PCT Search Report and Written Opinion mailed Apr. 28, 2014 for PCT application No. PCT/US13/78030, 13 pages.

Office Action for U.S. Appl. No. 14/137,813, mailed on Jul. 17, 2015, Hongliang Zhang, "Service Preferences for Multiple-Carrier-Enabled Devices", 9 pages.

Office action for U.S. Appl. No. 14/137,813, mailed on Feb. 1, 2016, Zhang, "Service Preferences for Multiple-Carrier-Enabled Devices", 9 pages.

Extended European Search Report mailed May 18, 2016, for European patent application No. 13867293.6, 13 pages.

Extended European Search Report mailed Jun. 23, 2016, for European Patent Application No. 13869568.9, 10 pages.

Office Action for U.S. Appl. No. 14/137,813, mailed on May 23, 2016, Hongliang Zhang, "Service Preferences for Multiple-Carrier-Enabled Devices", 9 pages.

Office action for U.S. Appl. No. 14/137,813, mailed on Dec. 1, 2016, Zhang, "Service Preferences for Multiple-Carrier-Enabled Devices", 12 pages.

* cited by examiner

INTELLIGENT ROUTING OF NETWORK PACKETS ON TELECOMMUNICATION DEVICES

BACKGROUND

Telecommunication devices have evolved from mobile replacements for the telephone to all-in-one communication, media, and productivity solutions. In addition to voice calling, telecommunication devices now support video and song playback, calendaring, and a variety of features requiring communication over a packet-based network. Such features include web browsing, video streaming, video chat, and many others. To support such packet-based communications, network operators have enhanced their circuit-based telecommunication network offerings by building and offering packet-based telecommunication networks, such as Long Term Evolution (LTE) and Evolved High-Speed Packet Access (HSPA+) networks. In addition to packet-based telecommunication network services, telecommunication devices are now also typically equipped to engage in packet-based communications through wireless data networks, such as WiFi networks, WiMax networks, or Bluetooth networks, or through infrared technology.

With the rapid spread of wireless data networks and packet-based telecommunication networks, telecommunication devices typically have multiple network connectivities to select from. For example, a telecommunication device could download an audio file via a packet-based telecommunication network offered by the network operator tethered to that telecommunication device or via a WiFi network. Typically, selection of a network connectivity is made based on a universal preference (e.g., always use WiFi when available). Such selection techniques often provide suboptimal results, however, and do not take full advantage of the continuously improving packet-based communication infrastructure available to telecommunication devices. Further, each network operator has advantages and disadvantages; some may offer great coverage, but at a high price, while others may offer suboptimal coverage at a lower price. Also, a given network operator may have better coverage in some locations than in others. Telecommunication devices are not able to take advantage of these varying benefits, however, as they are tethered to a single network operator.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
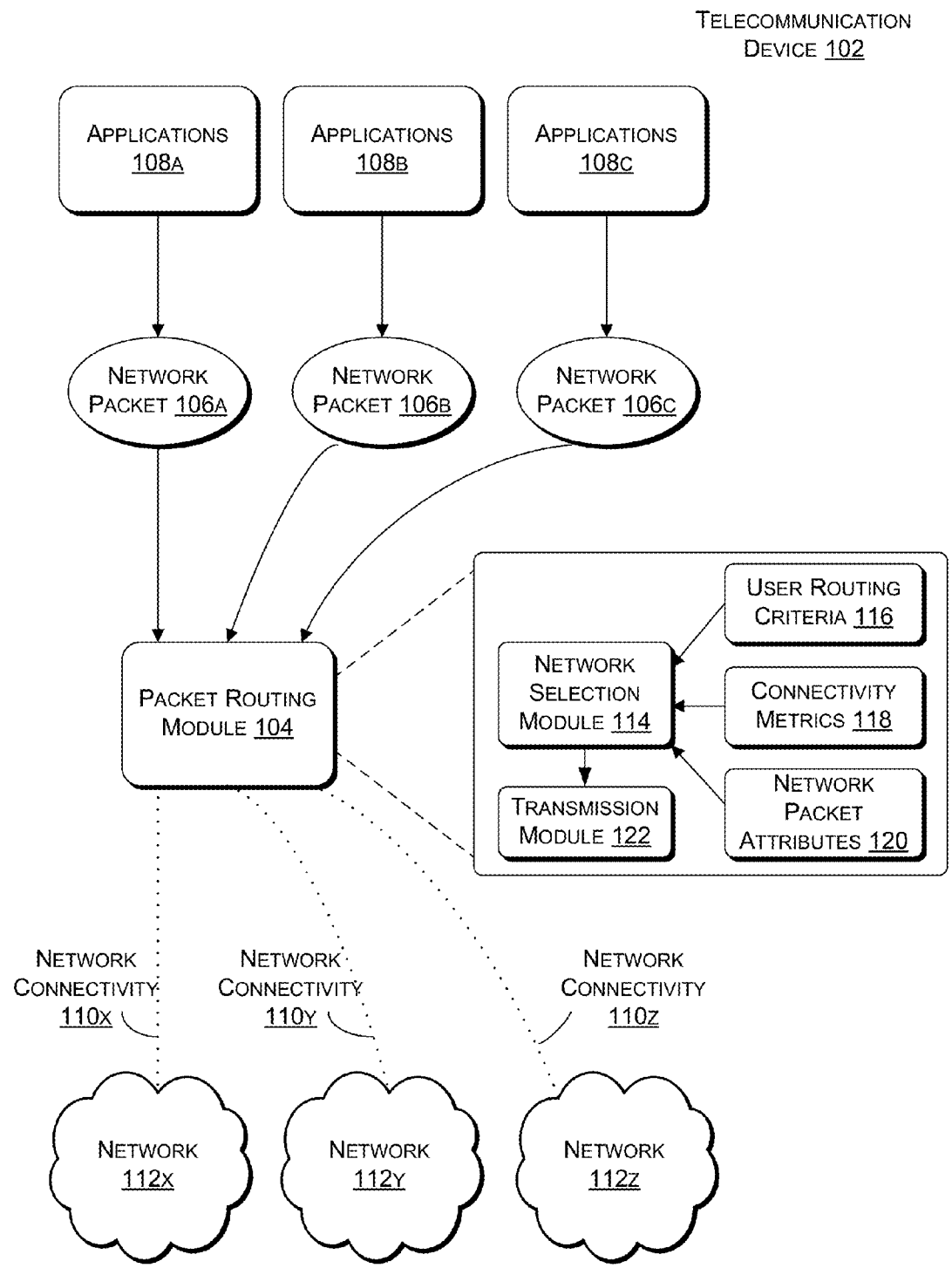
FIG. 1 illustrates an example telecommunication device routing module for intelligently selecting network connectivities to use for transmission of network packets.

This disclosure describes, in part, a telecommunications device configured to select, for each network packet to be sent, a network connectivity of the telecommunication device. A network connectivity, as the term is used herein, is a network that is available for connection to the telecommunication device. The telecommunication device utilizes metrics associated with each network connectivity, the metrics varying based on location, network type, and network operator, to select the network connectivity that is to be used to send the network packet. The connectivity metrics are evaluated based on user routing criteria and, optionally, attributes of the network packet to be sent. The use of these criteria, metrics, and attributes enables the telecommunication device to select an "optimal" network connectivity for each network packet. "Optimal" may be defined based on the degree to which connectivity metrics meet the user routing criteria given specific network packet attributes (or, if attributes are not used/available, given default network packet attributes). The user routing criteria may be dynamically updated, responsive either to changes by a user, by a service, or by a network operator. This technique for network connectivity selection based on user routing criteria, connectivity metrics, and packet network attributes, any of which may change from packet to packet, supports a wide variety of routing scenarios.

In a first routing scenario, the telecommunication device may have multiple network connectivities respectively associated with multiple, different network operators. In such a scenario, the user of the telecommunication device may not be tethered to a service plan of any specific network operator, or may be subject to a non-exclusive service plan. The telecommunication device may utilize a user routing criterion, such as "use lowest cost" or "best performance" and evaluate the connectivity metrics associated with the network connectivities in selecting a network connectivity. For example, a first network connectivity associated with a first network operator may have a lower cost than a second network connectivity associated with a second network operator. If the user routing criteria is "use lowest cost," the telecommunication device may select the first network connectivity.

As mentioned, user routing criteria may be dynamically updated, and connectivity metrics and network packet attributes vary. In a second scenario, packets associated with a single logical connection (e.g., a video call) may be transmitted first over one network connectivity and then another based on updated criteria or varying metrics/attributes without interruption to the logical connection. For example, the attributes of the network packets and connectivity metrics may stay largely the same, but the user may update preferences, causing automatic updating of user routing criteria. The user may update such preferences, for instance, because of suboptimal quality of experience. In this example, the update may result in user routing criteria that require a higher quality of service (QoS). This higher QoS may, in turn, result in the telecommunication device selecting a second network connectivity in place of a previously used, first network connectivity.

In a third routing scenario, different network connectivities may be associated with different network topologies. These different network topologies may result in significantly different network latencies. For example, a telecommunication device may have a first network connectivity associated with a WiFi network and a second network connectivity associated with an LTE network. The destination of the network packet to be transmitted may be geographically proximate to the telecommunication device, and the network topology of the LTE network may require all network traffic to be sent to a node of the LTE network's operator a significant distance from the telecommunication device. When using the LTE network, then, this far distance must be traversed twice to send the network packet to its destination. When using the WiFi network, only a short distance need be traversed. To detect such differences in network topologies, the telecommunication device may send messages to the destination using each of the network connectivities, receive responses, and calculate round trip times. These round trip times may then be evaluated in light of the user routing criteria to select a network connectivity.

Additionally, in a fourth scenario, the telecommunication device may select different network connectivities for uplink communications and downlink communications. As used herein, the term "downlink" refers to communications from one of the networks to the telecommunication device, and the term "uplink" refers to communications from the telecommunication devices to one or more of the networks.

Example Routing Module

FIG. 1 illustrates an example telecommunication device routing module for intelligently selecting network connectivities to use for transmission of network packets. As illustrated, a telecommunications device 102 may be configured with a packet routing module 104 to route network packets 106a-106c from telecommunication device applications 108a-108c. To transmit at least one of the network packets 106a-106c, the packet routing module 104 selects a network connectivity 110 of a plurality of network connectivities 110x-110z respectively associated with a plurality of networks 112x-112z. A network selection module 114 of the packet routing module 104 selects the network connectivity 110 based on an evaluation of user routing criteria 116, connectivity metrics 118 associated with the network connectivities 110x-110z, and network packet attributes 120 associated with the network packet(s) 106 that is/are to be transmitted. After selecting the network connectivity 110, a transmission module 122 of the packet routing module 104 then utilizes the selected network connectivity 110 to transmit the network packet(s) 106.

Figure 3:
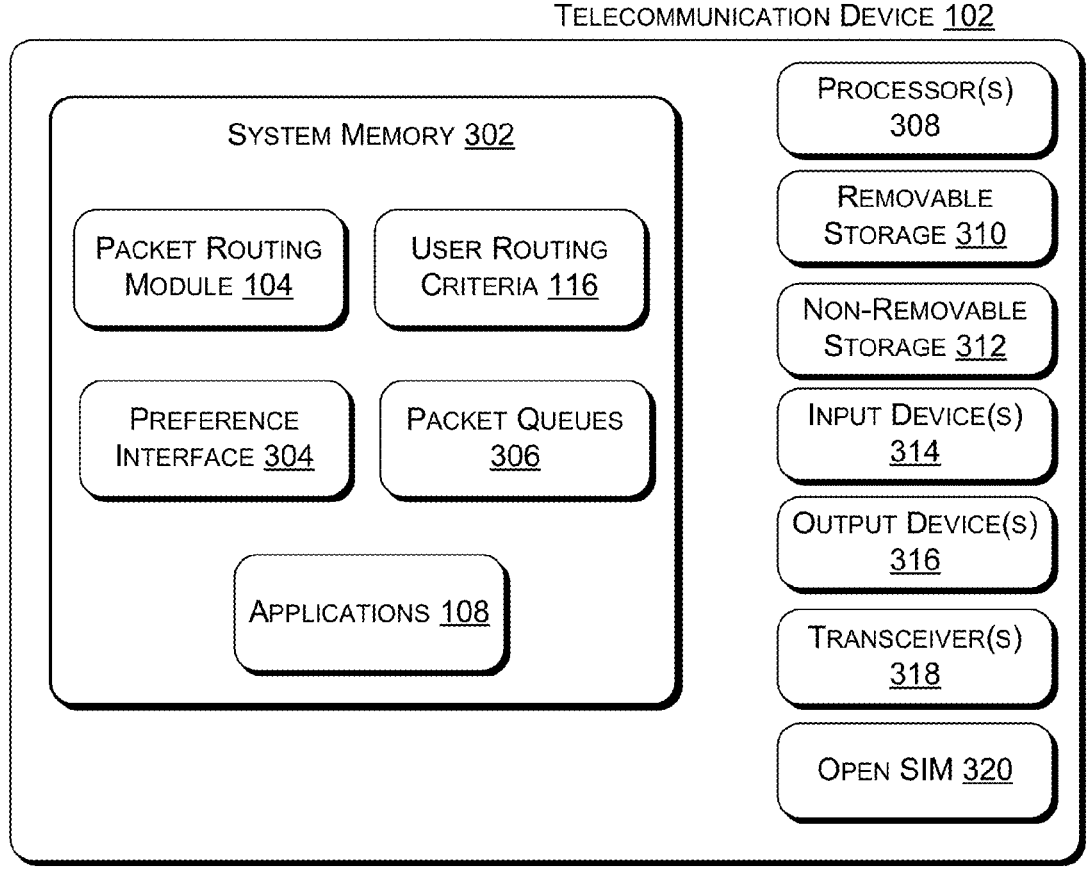
FIG. 3 illustrates an example telecommunication device configured with a routing module and user routing criteria for selecting network connectivities to use for transmission of network packets.

In various embodiments, the telecommunications device 102 may be any sort of device capable of engaging in packet-based connections and of having multiple wireless network connectivities, such as network connectivities 110x-110z. For example the telecommunications device 102 may be any of a smart phone, a tablet computer, a personal digital assistant (PDA), a personal computer (PC), a laptop computer, a media center, a work station, etc. An example telecommunications device 102 is illustrated in FIG. 3 and described below with reference to that figure.

In some embodiments, the packet routing module 104 receives the network packets 106a-106c from the applications 108a-108c and stores the network packets 106a-106c in a queue or stack associated with the packet routing module 104. The network packets 106a-106c may be any sort of Internet Protocol (IP) packets or other sort of network packets. The applications 108a-108c may be any sort of telecommunication device applications which send and receive network packets. For example, the application 108a may be a web browser and network packet 106a may be a request for web content. Application 108b may be a video call client and network packet 106b may be a packet associated with a video call. Application 108c may be client for a multi-player online game and network packet 106c may be a packet associated with a game-play session. These examples are provided only for the sake of illustration; applications 108a-108c may be or include many other different types of applications.

Upon storing the network packets 106a-106c in the queue or stack (or as they are stored), the packet routing module 104 may collect network packet attributes 120 of the network packets 106a-106c and perform quality of service (QoS) marking of the network packets 106a-106c. The collected network packet attributes 120 may include any of the network protocols of the network packets 106a-106c, such as the transmission control protocol (TCP), the user datagram protocol (UDP), or the real-time transport protocol (RTP), QoS profiles, packet size, destination address, bandwidth demand, class of services, or security level.

In various embodiments, before, during, and after receiving the network packets 106a-106c (e.g., on a substantially continuous basis), the packet routing module 104 determines the network connectivities 110x-110z available to the telecommunication device 102 as well as connectivity metrics 118 for those network connectivities 110x-110z. The network connectivities 110x-110z may be connectivities to a variety of different packet-based networks 112x-112z, such as WiFi networks, LTE network, or HSPA+ networks. The available network connectivities 112x-112z may change based on movement of the telecommunication device 102 to a different location or may even change at a given location based on factors such as signal strength or congestion of a network 112x-112z. The connectivity metrics 118 collected for each network connectivity 110x-110z may include:

a network protocol used for the associated network 112x-112z, such as TCP, UDP, or RTP, the availability of the associated network 112x-112z at the current location and time, performance of a transmission across the associated network 112x-112z (delay, jitter, packet-loss rate), power consumption associated with use of the associated network 112x-112z, a bandwidth profile for the associated network 112x-112z, connection cost for use of the associated network 112x-112z, or security level.

In various embodiments, the networks 112x-112z may represent one packet-based access network, such as a WiFi network, an LTE network, an HSPA+ network, a Bluetooth network, or a network associated with infrared technology. If one of the networks 112x-112z is a packet-based cellular network, such as a LTE network or an HSPA+ network, that network 112 may include a base station transceiver, base station controller, a node B, or an eNode B. Such a network 112 may provide connectivity to a core network of a network operator. In some embodiments, each of the networks 112x-112z that is a packet-based cellular network may be associated with a network operator. Multiple ones of the networks 112x-112z may be associated with a same network operator, or each of the networks 112x-112z may be associated with a different network operator. Networks 112x-112z that are non-cellular data networks, such as WiFi networks, may include an access point device for sending and receiving wireless transmissions. These access devices may in turn be associated with an Internet service provider that provides connectivity to the Internet. In one embodiment, the network 112x is a WiFi network and the network connectivity 110x is a connectivity to that network 112x. Also, the network 112y may be an LTE network and the network connectivity 110y may be a connectivity to that network 112y. Further, the network 112z may be an HSPA+ network and the network connectivity 110z may be a connectivity to that network 112z.

In various embodiments, the packet routing module 104 may include both a network selection module 114 and transmission module 122 to select a network connectivity 110 and to transmit network packet(s) 106 using the network connectivity 110. The network selection module 114 selects a network connectivity 110 for each received network packet 106 and may do so substantially when that network packet 106 is received or at a later time. Each selection is based on user routing criteria 116, connectivity metrics 118, and attributes 120 of the network packet 106 for which the network connectivity 110 is being selected. The connectivity metrics 118 may vary from moment to moment and from location to location, and the attributes 120 may be different for each network packet 106. Even when there is no substantial change in connectivity metrics 118 or attributes 120 between the receiving of two network packets 106, updates to the user routing criteria 116 may result in the network selection module 114 selecting different network connectivities 110.

In some embodiments, the user routing criteria 116 may be any of "best network performance" (which may be a function of factors such as packet delay, packet loss, and jitter), a specific QoS, "lowest cost", "lowest power consumption with the minimum bandwidth", "largest available bandwidth" given specific performance requirements such as CIR, EIR, PIR, or GBR, "best packet delivering efficiency" (e.g., by grouping/sorting network packets 106), "best overall metrics", "most secure connection", or some combination of these criteria. Other user routing criteria 116 may also or instead be used.

The user routing criteria 116 may be default or suggested criteria provided to/programmed on the telecommunication device 102 by a service, a network operator, or by a partner of a service or network operator. In some embodiments, such user routing criteria 116 may be associated with specific service plans offered by network operators. User routing criteria 116 may also be associated with a location or locations, and the user routing criteria 116 used may thus vary as a telecommunication device 102 moves from one location to another.

Also or instead, the user routing criteria 116 may be or include criteria automatically generated from user-provided preferences. For example, a user may enter preferences (such as "best performance" or "lowest cost") through some sort of user interface, such as a graphic user interface (GUI), physical input control, or voice input control. The telecommunication device 102 may then translate the user-provided preferences to user routing criteria 116 based on some rules or models. In some embodiments, rather than entering the user-provided preferences through an interface or control of the telecommunication device 102, the user of the telecommunication device 102 may enter the preferences through a web site. Also, in further embodiments, the telecommunication device 102 may provide a GUI that shows costs and performance associated with different user routing criteria 116 (e.g. decrease in cost per increase in delay measured in milliseconds, or increase in throughput per increase in power consumption). Such a GUI may enable a user to express preferences that result in more satisfactory user routing criteria 116.

The user routing criteria 116 may be dynamically updated at any time. For example, a user may be unhappy with the quality of the video played on the telecommunication devices 102 and may actuate a soft key or physical button, or may provide a spoken command (e.g., "increase quality"). This new user-provided preference may be translated into an updated user routing criteria 116 (e.g., better performance or improved QoS) that is used going forward in selecting network connectivities 110 for network packets 106.

In various embodiments, the network selection module 114 determines a score for each network connectivity 110. The score may reflect the degree to which the connectivity metrics 118 for the network connectivity 110 meet the user routing criteria 116 given the attributes 120 of the network packet 106 to be transmitted. The network selection module 114 may then select the network connectivity 110 with the highest score to use in transmitting the network packet 106. In some embodiments, the network selection module 114 may bypass the user routing criteria and automatically select a specific network connectivity 110 when it is available or when certain criteria are met. The specific network connectivity 110 may provide a default routing path.

Once the network selection module 114 has selected the network connectivity 110 to use for transmitting the network packet 106, the network selection module 114 invokes the transmission module 122. The transmission module 122 may establish a connection with the network 112 associated with the selected network connectivity 110, unless one is already established, and transmit the network packet 106 to the network 112 over the connection.

Example Routing Scenarios

Figure 2:
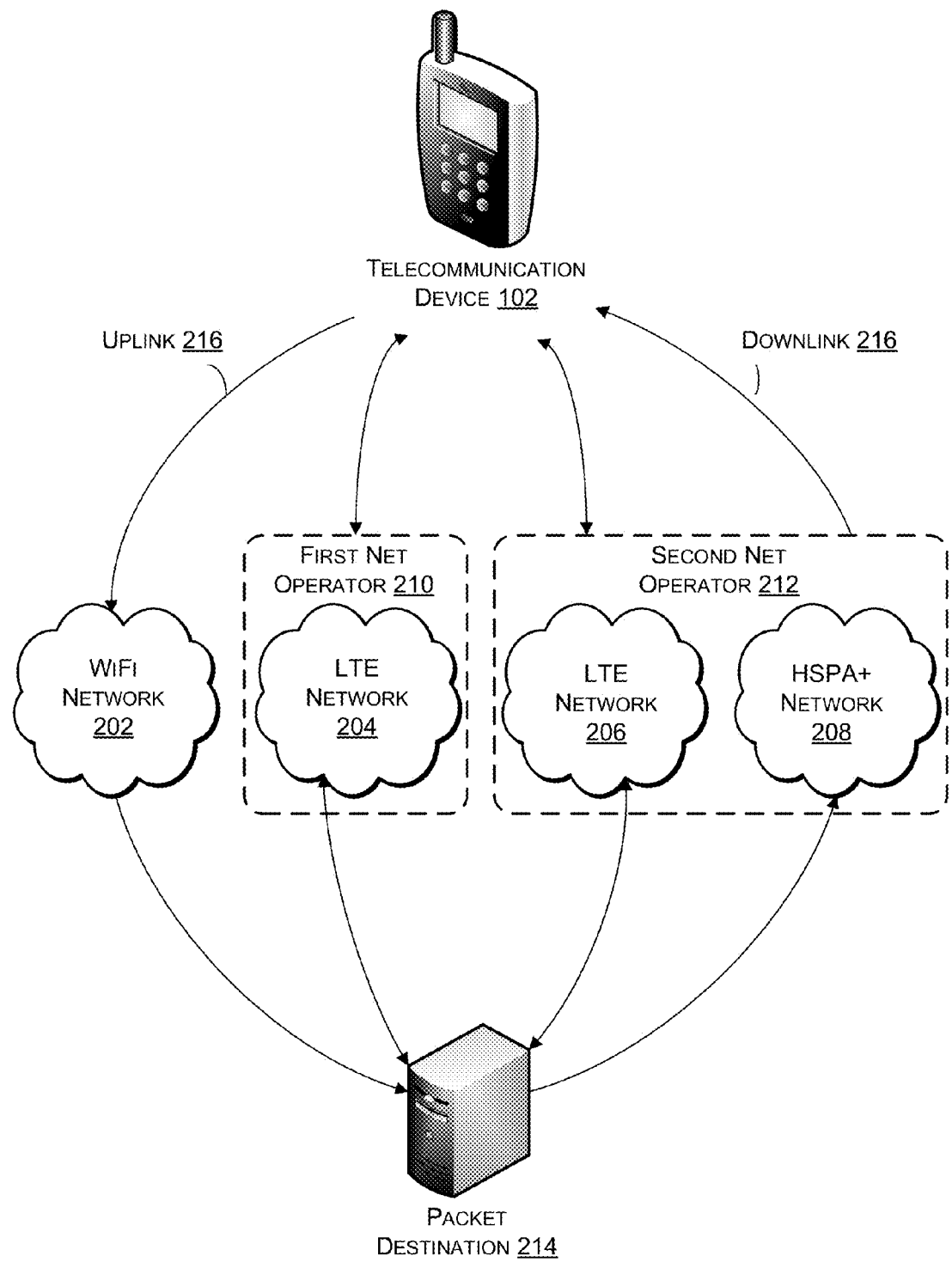
FIG. 2 illustrates a plurality of packet-based networks supporting various packet routing scenarios.

FIG. 2 illustrates a plurality of packet-based networks supporting various packet routing scenarios. As illustrated, the telecommunication device 102 has network connectivities associated with a WiFi network 202, an LTE network 204, an LTE network 206, and an HSPA+ network 208. The LTE network 204 is operated by a first network operator 210, and the LTE network 206 and HSPA+ network 208 are operated by a second network operator 212. The telecommunication device 102 may transmit one or more network packets to the packet destination 214 over one or more of the networks 202-208. Also, as illustrated, the telecommunication device may select one network connectivity, such as the network connectivity associated with the HSPA+ network 208, for downlink communications 216 and another network connectivity, such as the network connectivity associated with the WiFi network 202, for uplink communications 218.

In various embodiments, the networks 202-208 may be examples of the networks 112 illustrated in FIG. 1 and described herein with reference to that figure.

The first network operator 210 and second network operator 212 may be any sort of network operators, such as telecommunication service providers that operate a telecommunication infrastructure, including access networks and a core network, to provide telecommunication services such as voice calling, video calling, messaging, email, and data (e.g., streaming video and audio or web browsing). The first and second network operator 210 and 212 may offer these services as part of service plans subscribed to by telecommunication device users or may allow the services to be purchased incrementally (e.g., per packet, per communication, per connection, etc.).

The packet destination 214 may be any sort of device or devices identifiable by a network address. Such a device or devices may include another telecommunication device, a server, a network or cloud, or any sort of computing device. The network address of the packet destination 214 is specified by the network packet that is to be transmitted to the packet destination 214.

In a first routing scenario, the telecommunication device 102 has multiple network connectivities respectively associated with multiple, different network operators, including the first network operator 210 and the second network operator 212. In such a scenario, the user of the telecommunication device may not be tethered to a service plan of any specific network operator, or may be subject to a non-exclusive service plan. The telecommunication device 102 may utilize a user routing criteria, such as "use lowest cost" or "best performance" and evaluate the connectivity metrics associated with the network connectivities in selecting a network connectivity. For example, a first network connectivity associated with an LTE network 204 operated by the first network operator 210 may have a lower cost than a second network connectivity associated with an LTE network 206 operated by the second network operator 212. If the user routing criteria is "use lowest cost," the telecommunication device 102 may select the first network connectivity associated with the LTE network 204, establish a connection to the LTE network 204 (or use an established connection) and transmit a network packet to the packet destination 214 over the LTE network 204. After transmitting the network packet, there may be a change to the user routing criteria, connectivity metrics, or packet attributes. For example, the second network operator may lower its cost, and that lower cost may be reflected in updated connectivity metrics. If the user routing criteria is still "use lowest cost" the telecommunication device 102 may then select the second network connectivity associated with the LTE network 206 for transmission of further network packets.

In a second scenario, network packets associated with a single logical connection (e.g., a video call) may be transmitted first over one network (e.g., LTE network 206) and then another (e.g., HSPA+ network 208) based on updated criteria or varying metrics/attributes, without interruption to the logical connection. For example, the attributes of the network packets and connectivity metrics may stay largely the same, but the user may update preferences, causing automatic updating of user routing criteria. The user may update such preferences, for instance, because of suboptimal quality of experience. In this example, the update may result in user routing criteria that require a higher quality of service (QoS). This higher QoS may, in turn, result in the telecommunication device 102 selecting a second network (e.g., HSPA+ network 208) in place of a previously used, first network (e.g., LTE network 206).

In a third routing scenario, different networks 202-208 may be associated with different network topologies. These different network topologies may result in significantly different network latencies. For example, a telecommunication device 102 may have a first network connectivity associated with a WiFi network 202 and a second network connectivity associated with an LTE network 204. The packet destination 214 may be geographically proximate to the telecommunication device 102, and the network topology of the LTE network 204 may require all network traffic to be sent to a node of the first network operator 210 a significant distance from the telecommunication device 102. When using the LTE network 204, then, this far distance must be traversed twice to send the network packet to its destination 214. When using the WiFi network 202, only a short distance need be traversed. To detect such differences in network topologies, the telecommunication device 102 may send messages to the destination 214 using each of the networks 202 and 204, receive responses, and calculate round trip times. This may be performed by the telecommunication device 102, for example, using a ping utility. These round trip times may then be evaluated in light of the user routing criteria to select a network connectivity. If the user routing criteria is "select lowest network latency," the telecommunication device 102 may select the WiFi network 202.

In some embodiments, the calculation of network latencies need not be repeated for each packet; rather, the telecommunication device 102 need only calculate the network latencies once for a logical connection, a session, a flow, or for packets associated with a same destination 214 that are transmitted within a time window of each other.

In a fourth scenario, the telecommunication device 102 may select different network connectivities for uplink communications and downlink communications. For example the telecommunication device 102 may select a network connectivity associated with the HSPA+ network 208 for downlink communications 216 and a network connectivity associated with the WiFi network 202 for uplink communications 218. The telecommunication device 102 may then transmit network packets using the WiFi network 202 and receive network packets using the HSPA+ network 208.

In a fifth routing scenario, telecommunication device 102 may sort or combine for transmission multiple network packets to better achieve the user routing criteria. This may involve grouping network packets by size, destination, or QoS profile and transmitting the grouped networked packets using a same one of the networks 202-208 or concurrently over multiple ones of the networks 202-208. Also or instead, the sorting may involve prioritizing some network packets and delaying others.

In a sixth routing scenario, the telecommunication device 102 may utilize "maximum throughput" as the user routing criteria and may, as a result, select all available network connectivities for transmission of packets to the packet destination 214. In such a scenario, the telecommunication device 102 may connect to each of the networks 202-208 and may simultaneously transmit packets over all of the networks 202-208.

The above scenarios are described for the sake of illustration and do not limit the routing scenarios possible given the packet routing techniques described herein.

Example Telecommunication Device

FIG. 3 illustrates an example telecommunication device configured with a routing module and user routing criteria for selecting network connectivities to use for transmission of network packets. As illustrated, telecommunication device 102 comprises a system memory 302 storing a packet routing module 104, user routing criteria 116, a preference interface 304, packet queues 306, and applications 108. Also, the telecommunication device 102 includes processor(s) 308, a removable storage 310 and non-removable storage 312, input device(s) 314, output device(s) 316, transceivers 318, and, optionally, an open subscriber identity module (SIM) 320.

In various embodiments, system memory 302 is volatile (such as RAM), non-volatile (such as ROM, flash memory, etc.) or some combination of the two. The packet routing module 104, user routing criteria 116, a preference interface 304, packet queues 306, and applications 108 stored in the system memory 302 may comprise methods, threads, processes, applications or any other sort of executable instructions. The packet routing module 104, user routing criteria 116, a preference interface 304, packet queues 306, and applications 108 may also include files and databases. Further description of the packet routing module 104, user routing criteria 116, and applications 108 is provided above.

In further embodiments, the preference interface 304 may be any sort of GUI, physical control, or voice control through which a user may enter preferences used to generate or update user routing criteria 116. Such preference interfaces 304 are described in further detail herein when describing the user routing criteria 116.

In various embodiments, the packet queues 306 may include one or more queues or stacks associated with the packet routing module 104. Such packet queues 306 may be used to store the network packets 106 pending selection of a network connectivity 110 for each network packet 106. Packet queues 306 may also include queues or stacks associated with wireless transceivers 318 or with network protocols used in transmitting the network packets 306 to network(s) 112.

In some embodiments, the processor(s) 308 is a central processing unit (CPU), a graphics processing unit (GPU), or both CPU and GPU, or other processing unit or component known in the art.

Telecommunication device 102 also includes additional data storage devices (removable and/or non-removable) such as, for example, magnetic disks, optical disks, or tape. Such additional storage is illustrated in FIG. 3 by removable storage 310 and non-removable storage 312. Tangible computer-readable media may include volatile and nonvolatile, removable and non-removable media implemented in any method or technology for storage of information, such as computer readable instructions, data structures, program modules, or other data. System memory 302, removable storage 310 and non-removable storage 312 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the telecommunication device 102. Any such tangible computer-readable media may be part of the telecommunication device 102.

Telecommunication device 102 also has input device(s) 314, such as a keypad, a cursor control, a touch-sensitive display, voice input device, etc., and output device(s) 316 such as a display, speakers, etc. These devices are well known in the art and need not be discussed at length here.

As illustrated in FIG. 3, the telecommunication device 102 also includes one or more wireless transceivers 318, such as a wireless transceiver for each network connectivity or a wireless transceiver capable of communicating with multiple networks. The telecommunication device 102 may also have a single wireless transceiver 318 with multiple soft radios, such as a soft radio for each network connectivity 110. To increase throughput, the wireless transceivers 318 may utilize multiple-input/multiple-output (MIMO) technology. The wireless transceivers 318 may be any sort of wireless transceivers capable of engaging in wireless, radio frequency (RF) communication. The wireless transceivers 318 may also include other wireless modems, such as a modem for engaging in WiFi, WiMax, Bluetooth, or infrared communication.

Open SIM 320 may be an optional SIM that is not tethered to any specific network operator. Typically, a SIM is tethered to a specific network operator, providing information (e.g., authentication information) to its network operator that utilizes in enabling services and connectivity for the telecommunication device that includes the SIM. The open SIM 320 provides similar information to any network operator or to a specific subset of network operators, enabling the telecommunication device 102 to switch between different network connectivities 110 of different network operators. In other embodiments, no open SIM 320 is needed to switch between different network connectivities 110 of different network operators.

Example Processes

FIGS. 4-7 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
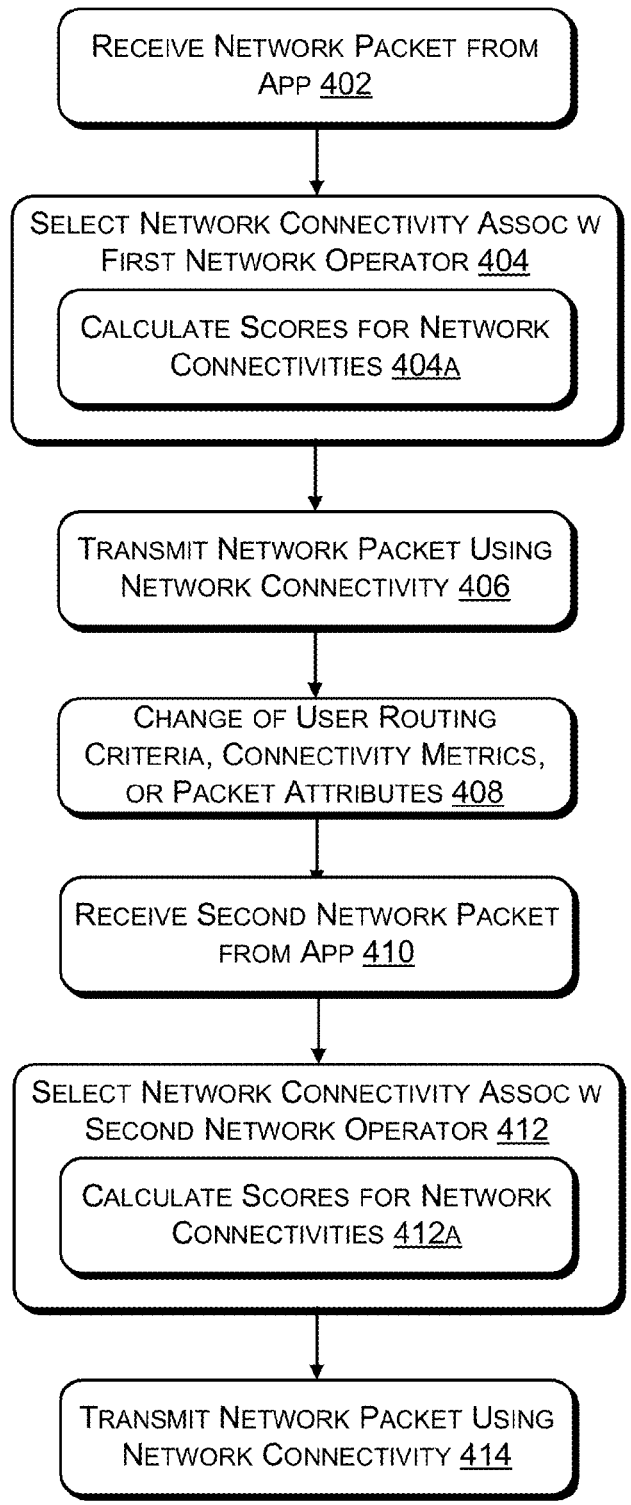
FIG. 4 illustrates an example process for selecting one network connectivity from a plurality of network connectivities respectively associated with different network operators and for using the selected network connectivity to transmit a network packet.

FIG. 4 illustrates an example process for selecting one network connectivity from a plurality of network connectivities respectively associated with different network operators and for using the selected network connectivity to transmit a network packet. The process includes, at 402, receiving, by a telecommunication device, a network packet from an application of the telecommunication device.

At 404, the telecommunication device selects a network connectivity from a plurality of network connectivities based at least in part on user routing criteria and connectivity metrics. The plurality of network connectivities may be respectively associated with a plurality of network operators, and the user of the telecommunication device may or may not subscribe to service plans associated with the network operators. At 404a, the selecting further comprises determining a score for each network connectivity by applying the user routing criteria to the connectivity metrics associated with that network connectivity. In some embodiments, determining the score further comprises applying the user routing criteria to attributes of the network packet.

At 406, the telecommunication device transmits the network packet using the selected network connectivity.

At 408, the user routing criteria, connectivity metrics, network packet attributes, or telecommunication device location may be updated, and, at 410, the telecommunication device may subsequently receive a second network packet.

Based on the update, the telecommunication device may, at 412, select a different one of the network connectivities than selected at 404. The different one of the network connectivities may be associated with a different one of the network operators. At 412a, the selecting includes determining a score for each network connectivity by applying the user routing criteria to the connectivity metrics associated with that network connectivity. In some embodiments, determining the score further comprises applying the user routing criteria to attributes of the second network packet.

At 414, the telecommunication device transmits the second network packet using the selected, different network connectivity.

Figure 5:
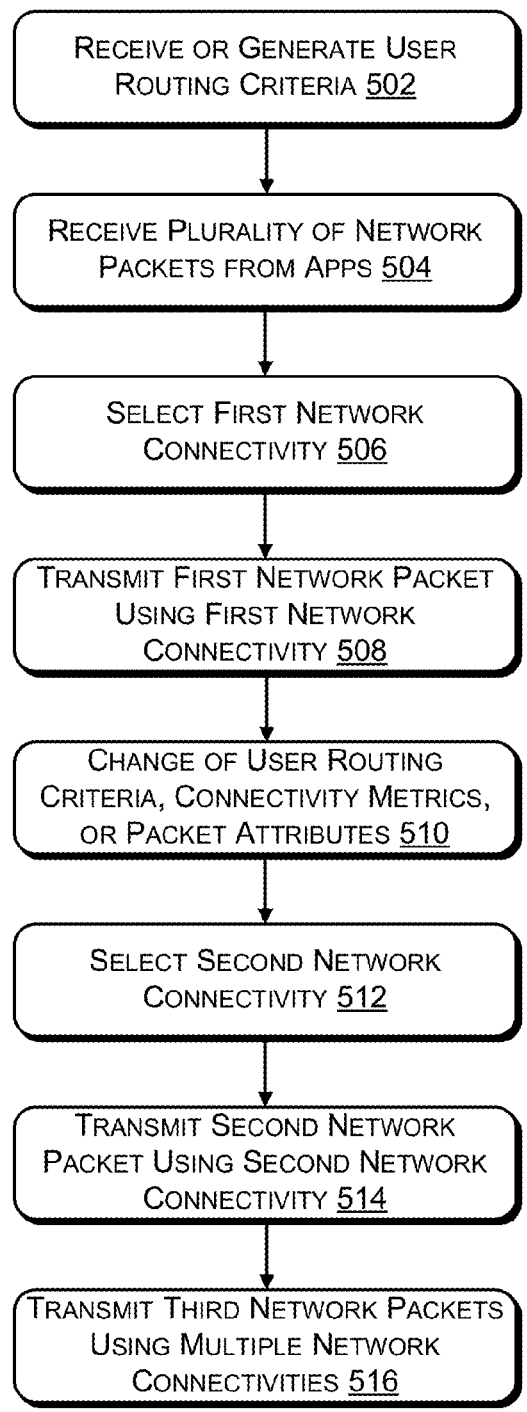
FIG. 5 illustrates an example process for receiving network packets associated with a logical connection, transmitting a first of the network packets using a first network connectivity, and transmitting a second of the network packets using a second network connectivity.

FIG. 5 illustrates an example process for receiving network packets associated with a logical connection, transmitting a first of the network packets using a first network connectivity, and transmitting a second of the network packets using a second network connectivity. The process includes, at 502, receiving or generating user routing criteria. The user routing criteria may be default user routing criteria, may be suggested user routing criteria received from a service or network operator, may be automatically generated by the telecommunication device based on user-provided preferences, or may be specific to a location.

At 504, the telecommunication device may receive a plurality of network packets from a telecommunication device application, the packets associated with a logical connection.

At 506, the telecommunication device may select a first network connectivity from a plurality of network connectivities of the telecommunication device based at least in part on the user routing criteria and on connectivity metrics. The user routing criteria may include a network performance, a QoS, a cost, a power consumption at a lowest bandwidth, an available bandwidth given specific performance requirements, a packet delivering efficiency, or security level, a user preference for an operator, or a combination of criteria (such as a combination of any of the previously mentioned user routing criteria). The connectivity metrics may include a network protocol, a network availability, a network performance, a QoS, a power consumption, a network bandwidth profile, a cost, or a security level. Also, the first network connectivity may be one of a WiFi network connectivity, a LTE network connectivity, a HSPA+ network connectivity, a Bluetooth network connectivity, or an infrared network connectivity. In some embodiments, the first network connectivity may be selected based at least in part on attributes of the first network packet. Such attributes may include a network protocol, a QoS profile, a packet size, a destination address, a bandwidth demand, a service class, or a security level.

At 508, the telecommunication device may transmit a first of the network packets using the first network connectivity.

At 510, the user routing criteria, connectivity metrics, network packet attributes, or telecommunication device location may be dynamically updated after transmitting the first network packet but before transmitting others of the network packets.

After the update, at 512, the telecommunication device may select a second network connectivity from the plurality of network connectivities of the telecommunication device based at least in part on the user routing criteria and on connectivity metrics. The second network connectivity may be one of a WiFi network connectivity, a LTE network connectivity, a HSPA+ network connectivity, a Bluetooth network connectivity, or an infrared network connectivity. The first and second network connectivities may be different network connectivities and may or may not be associated with a same network operator. In some embodiments, the second network connectivity may be selected based at least in part on attributes of the second network packet. Such attributes may include a network protocol, a QoS profile, a packet size, a destination address, a bandwidth demand, a service class, or a security level.

At 514, the telecommunication device may transmit a second of the network packets using the second network connectivity.

At 516, the telecommunication device transmits others of the network packets simultaneously using the first and second network connectivities.

Figure 6:
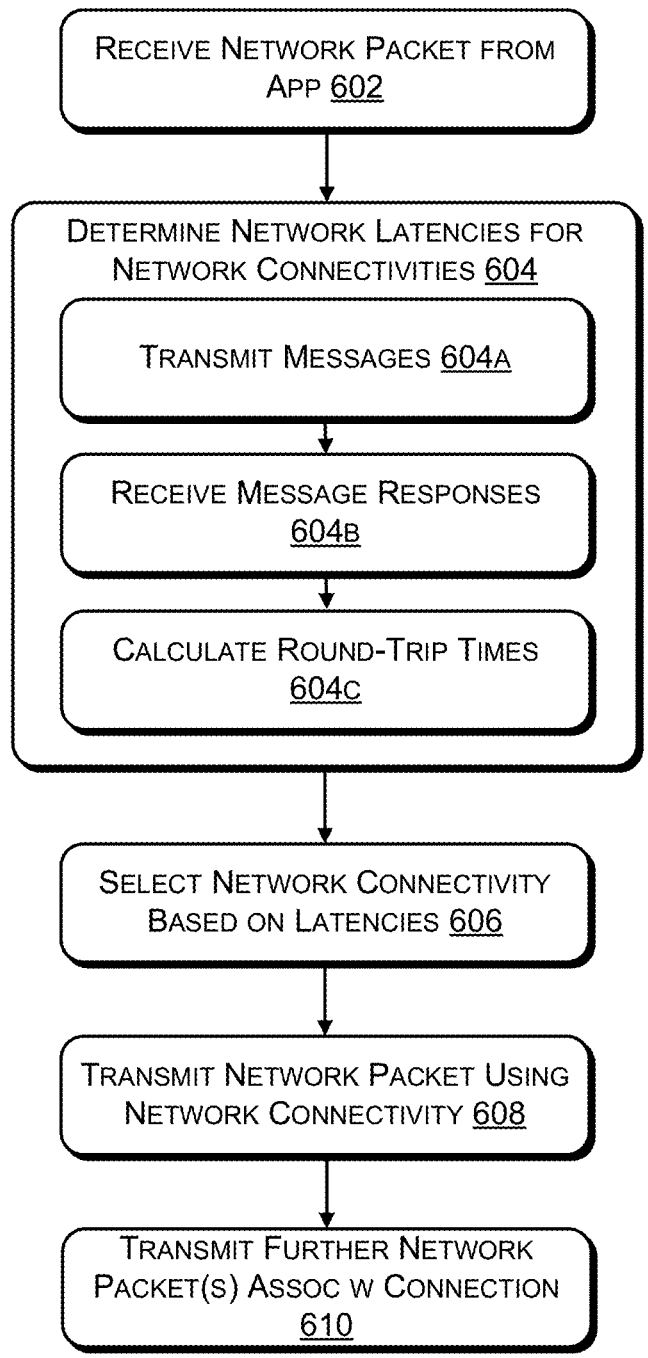
FIG. 6 illustrates an example process for selecting one network connectivity from a plurality of network connectivities based on network latencies associated with the network connectivities and for using the selected network connectivity to transmit a network packet.

FIG. 6 illustrates an example process for selecting one network connectivity from a plurality of network connectivities based on network latencies associated with the network connectivities and for using the selected network connectivity to transmit a network packet. The process includes, at 602, receiving, by a telecommunication device a network packet from a telecommunication device application.

At 604, the telecommunication device determines network latencies respectively associated with network connectivities of the telecommunication device. The determining may include transmitting, at 604a, messages to a destination associated with the network packet over networks associated with the network connectivities, receiving, at 604b, responses to the messages, and, for each message-response pair, calculating, at 604c, a difference between a message transmission time and a response reception time. In some embodiments, the telecommunication device may determine the network latencies once for a plurality of network packets, including the network packet, associated with a logical connection, a session, or a flow.

At 606, the telecommunication device selects one of the network connectivities based at least in part on user routing criteria and the network latencies. In some embodiments, the telecommunication device may further base the selection at least in part on connectivity metrics and attributes of the network packet.

At 608, the telecommunication device transmits the network packet using the selected network connectivity.

At 610, the telecommunication device transmits further network packets associated with the logical connection, the session, or the flow using the selected network connectivity.

Figure 7:
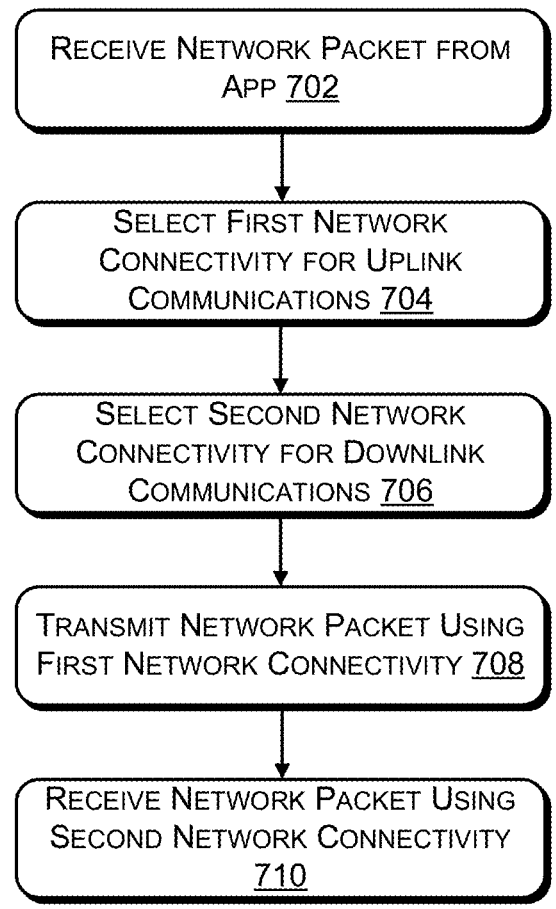
FIG. 7 illustrates an example process for selecting a first network connectivity for uplink communications and selecting a second network connectivity for downlink communications.

FIG. 7 illustrates an example process for selecting a first network connectivity for uplink communications and selecting a second network connectivity for downlink communications. The process includes, at 702, receiving, by a telecommunication device a network packet from a telecommunication device application.

At 704, the telecommunication device selects a first network connectivity for uplink communications based at least in part on user routing criteria and connectivity metrics. The user routing criteria may include a network performance, a QoS, a cost, a power consumption at a lowest bandwidth, an available bandwidth given specific performance requirements, a packet delivering efficiency, a security level, a user preference for an operator, or a combination of criteria (such as a combination of any of the previously mentioned user routing criteria). The connectivity metrics may include a network protocol, a network availability, a network performance, a QoS, a power consumption, a network bandwidth profile, a cost, or a security level.

At 706, the telecommunication device selects a second network connectivity for downlink communications based at least in part on the user routing criteria and the connectivity metrics.

At 708, the telecommunication device transmits a network packet using the first network connectivity.

At 710, the telecommunication device receives a network packet using the second network connectivity.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    receiving, by a telecommunication device, a first network packet and a second network packet from one or more applications of the telecommunication device;
    determining, for the first network packet, a first score for a first telecommunication network by applying user routing criteria to (i) first connectivity metrics associated with the first telecommunication network, and (ii) first network packet attributes of the first network packet;
    determining, for the first network packet, a second score for a second telecommunication network by applying the user routing criteria to (i) second connectivity metrics associated with the second telecommunication network, and (ii) the first network packet attributes of the first network packet;
    based on a first comparison of the first score to the second score, selecting the first telecommunication network for transmission of the first network packet by the telecommunication device;
    determining, for the second network packet, a third score for the first telecommunication network by applying the user routing criteria to (i) the first connectivity metrics associated with the first telecommunication network, and (ii) second network packet attributes of the second network packet;
    determining, for the second network packet, a fourth score for the second telecommunication network by applying the user routing criteria to (i) the second connectivity metrics associated with the second telecommunication network, and (ii) the second network packet attributes of the second network packet;
    based on a second comparison of the third score to the fourth score, selecting the second telecommunication network for transmission of the second network packet by the telecommunication device;
    transmitting, by the telecommunication device, the first network packet using the first telecommunication network while simultaneously transmitting the second network packet using the second telecommunication network.

2. The method of claim 1, wherein the first telecommunication network and the second telecommunication network are respectively associated with different network operators.

3. The method of claim 2, wherein the different network operators are used for the first network packet and the second network packet because of a change to the user routing criteria or the connectivity metrics.

4. A method comprising:
    receiving, by a telecommunication device, a plurality of network packets associated with at least one logical connection;
    grouping the plurality of network packets into at least a first group of network packets and a second group of network packets, the grouping based on one or more of packet-size, packet-destination, or packet Quality-of-Service profile;
    based on the grouping, prioritizing transmission of the first group of network packets over transmission of the second group of network packets;
    based on the prioritizing, transmitting, by the telecommunication device, the first group of network packets using a first network connectivity associated with a first network operator selected based at least in part on first user routing criteria and connectivity metrics; and
    based on the prioritizing and after transmitting the first group of network packets, transmitting, by the telecommunication device, the second group of network packets using a second network connectivity associated with a second network operator selected based at least in part on second user routing criteria and the connectivity metrics, wherein the second user routing criteria differ from the first user routing criteria;
    wherein the first network connectivity and the second network connectivity are different network connectivities.

5. The method of claim 4, wherein the connectivity metrics include a network protocol, a network availability, a network performance, a quality of service (QoS), a power consumption, a network bandwidth profile, a cost, or a security level.

6. The method of claim 4, wherein the connectivity metrics are updated between the transmitting the of the first group of network packets and the transmitting of the second group of network packets.

7. The method of claim 6, wherein the update results from movement from a first location to a second location.

8. The method of claim 4, wherein the user routing criteria include a network performance, a QoS, a cost, a power consumption at a lowest bandwidth, an available bandwidth given specific performance requirements, a packet delivering efficiency, a security level, a user preference for an operator, or a combination of criteria.

9. The method of claim 8, wherein the first or second user routing criteria further include default user routing criteria, suggested user routing criteria, or user routing criteria automatically generated based on user-provided preferences.

10. The method of claim 8, further comprising dynamically updating the second user routing criteria in real-time based on user-provided preferences, on criteria received from a network operator, or on criteria received from a host service.

11. The method of claim 4, wherein the first or second user routing criteria are updated between the transmitting the of the first group of network packets and the transmitting of the second group of network packets responsive to user-provided preferences.

12. The method of claim 4, wherein the first network connectivity or the second network connectivity is one of a WiFi network connectivity, a LTE network connectivity, a HSPA+ network connectivity, a Bluetooth network connectivity, or an infrared network connectivity.

13. The method of claim 4, further comprising at least one of selecting the first network connectivity based at least in part on attributes of the first group of network packets or selecting the second network connectivity based at least in part on attributes of the second group of network packets.

14. The method of claim 13, wherein the attributes of the first group of network packets or the attributes of the second group of network packets include a network protocol, a QoS profile, a packet size, a destination address, a bandwidth demand, a service class, or a security level.

15. A telecommunication device comprising:

a processor;

one or more wireless communication transceivers configured to communicate with a plurality of networks; and a packet routing module configured to be operated by the processor to receive a first network packet and a second network packet from one or more applications of the telecommunication device, the packet routing module including:

a network selection module to:

determine a first-packet score for each network, with respect to the first network packet, by applying user routing criteria to network metrics associated with each network and to first network packet attributes of the first network packet;

select, for the first network packet, a first telecommunication network from the plurality of telecommunication networks based at least in part on a comparison of first-packet scores associated with the first network packet;

determine a second-packet score for each network, with respect to the second network packet, by applying the user routing criteria to network metrics associated with each network and to second network packet attributes of the second network packet; and select, for the second network packet, a second telecommunication network from the plurality of networks based at least in part on a comparison of second-packet scores associated with the second network packet, and a transmission module to route the first network packet for transmission to the selected first telecommunication network and the second network packet for transmission to the selected second telecommunication network.

16. The telecommunication device of claim 15, wherein the first telecommunication network and the second telecommunication network are respectively associated with different network operators.

17. One or more non-transitory computer-readable media having stored thereon a plurality of executable instructions configured to program a telecommunication device to perform operations comprising:

receiving a plurality of network packets associated with at least one logical connection;

grouping, based on at least one of packet-size or packet-destination, the plurality of network packets into at least a first group of network packets and a second group of network packets;

at a first location, transmitting the first group of network packets using a first network connectivity associated with a first network operator selected to transmit the first group of network packets based at least in part on first user routing criteria and connectivity metrics, wherein the first user routing criteria are specific to the first location; and after transmitting the first group of network packets, transmitting, at a second location, the second group of network packets using a second network connectivity associated with a second network operator selected to transmit the second group of network packets based at least in part on second user routing criteria and the connectivity metrics, wherein the second user routing criteria differ from the first user routing criteria, wherein the first network connectivity and the second network connectivity are different network connectivities.

18. The one or more non-transitory computer-readable media of claim 17, wherein the connectivity metrics include a network protocol, a network availability, a network performance, a quality of service (QoS), a power consumption, a network bandwidth profile, a cost, or a security level.

19. The one or more non-transitory computer-readable media of claim 17, wherein the first or second user routing criteria further include a network performance, a QoS, a cost, a power consumption at a lowest bandwidth, an available bandwidth given specific performance requirements, a packet delivering efficiency, a security level, a user preference for an operator, or a combination of criteria.

* * * * *